July 12, 1932.   H. A. DENMIRE   1,866,628
INNER TUBE FOR PNEUMATIC TIRES AND APPARATUS FOR THE MANUFACTURE THEREOF Filed July 31, 1926

INVENTOR
Harold A. Denmire
BY Evans & McCoy
ATTORNEYS

Patented July 12, 1932

1,866,628

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

INNER TUBE FOR PNEUMATIC TIRES AND APPARATUS FOR THE MANUFACTURE THEREOF

Application filed July 31, 1926. Serial No. 126,225.

This invention relates to inner tubes for pneumatic tires and it particularly contemplates an improved form of inner tube and improved apparatus for manufacturing the same.

In the manufacture of inner tubes for pneumatic tires, the conventional practice for small size tubes is to roll a suitable prepared sheet of unvulcanized rubber on a metal pole, wrap a strip of fabric about the rubber to compact the rubber against the surface of the pole, and vulcanize. After the rubber is cured, the wrappings are removed and the rubber tube, now fully vulcanized, is stripped from the pole. In carrying out the manufacture of tubes in this way, considerable difficulty has been experienced in properly cleaning the surface of the pole after the vulcanizing operation. Trouble has also been encountered and defective tubes have resulted from the entrapped air between the pole and the sheet of rubber that is applied thereto.

Whenever air is entrapped between the pole and the rubber sheet that is wound thereon to form the tube, a discolored spot is formed on the tube, by the oxidation of the rubber surface that is not held in contact with the steel pole. The appearance of the tube is such that it must usually be sold as a "second" because of its defective character. With some companies, the practice has been to buff off the discolored spot so formed and to then polish the surface of the tube to remove the discoloration. This always results in weakening the tube wall and in producing defective merchandise.

In the application of inner tubes to pneumatic tire casings, it is conventional practice to interpose sufficient talc, powdered mica, or other lubricating material between the inner tube and the tire casing in order to prevent adhesion of the tube wall to the inner face of the tire carcass. Such adhesion many times causes the destruction of the tube because, when the tube is removed, the wall of the tube is torn by impatient operators. If the tube is carefully removed after adhesion of this character has developed, the surface of the tube and of the tire casing is badly mutilated. The heat that is developed in the tire casing during operation in some climates and over some roads tends to vulcanize the tube and casing together unless there is a sufficient layer of talc, powdered mica or other suitable material to prevent adhesion. Even although there is a sufficient quantity of such material within the tire casing, trouble may result from uneven distribution of the material over the tube wall.

In accordance with this invention I propose the use of a knurled molding surface for the manufacture of tubes in accordance with the above designated process that assists in the distribution of entrapped air, that renders the molding surface more easily cleaned and that provides a superior and improved outside surface on the tube.

The use of a pole, the surface of which is knurled, has many advantages. The many channels that are provided in the surface of the pole by the knurling operation so greatly distribute entrapped air over the surface of the pole as to substantially preclude the staining or localized discoloring of the tube surface due to the air pockets so formed. Furthermore, the multiplicity of grooves formed by the knurling of the pole surface provide a multitude of leads for conducting air from between the pole and the rubber sheet that is applied thereto, thus substantially removing all objectionable air from between these parts. If a smooth pole is used, the application of the wrapping to the applied sheet of rubber on the pole in many instances does not squeeze all of the air from between the pole and the rubber sheet, whereas, if a knurled surface is used, the multiplicity of grooves in the pole surface provide ready channels for the escape of the air.

This invention also contemplates a form of inner tube having a knurled outer surface that provides a multiplicity of small pockets over the surface of the tube that entrap talc, powdered mica or other lubricant and maintain it distributed over the surface of the tube, thus preventing adhesion between the tube and the tire casing and greatly extending the normal life of the tube when sufficient talc or mica is used between the tube and the tire casing. The multiplicity of ridges that are formed on the outer surface of the tube also hold the body of the side wall of the tube slightly away from the casing wall and take up any wear between the casing and the tube in the raised ridges, the intervening pockets being usually filled with the talc or other lubricating material suitable for such use.

A more detailed understanding of my invention may be had from a consideration of the accompanying drawing wherein.

In the practice of the invention herein described, a metal pole 10 is first passed through a knurling machine (not shown) and its entire molding surface is knurled to provide a series of relatively small intersecting grooves extending over the surface of the pole. A sheet of unvulcanized rubber 11, that is of sufficient width to be wrapped several times around the pole 10 to provide a laminated tube of desired thickness, is cut with offset ends 11a and 11b that decrease the thickness of the tube ends and minimize the labor necessary to properly skive the ends of the tube.

The rubber sheet thus formed into an elongated tube is covered by a fabric wrapping 12 that compresses the applied sheet of rubber against the face of the pole and, because of its progressive advance along the surface of the tube as it is wound thereon, it progressively removes the air from between the pole and the applied sheet of rubber. If air is entrapped between the pole and the sheet of rubber when it is applied, it is permitted to escape along the many paths provided in the knurled surface, or the air thus pocketed is so greatly distributed by the multiplicity of grooves formed by the knurling operation as to minimize the discoloration of the tube surface through the action of the entrapped air. The formation of intersecting ridges on the surface of the tube also assist in diverting attention from discolorations of this character since either the ridges or the adjacent tube wall will be brought into contact with the surface of the pole by the action of the wrappings. This breaking up of the discoloration is of considerable commercial value, and it enables the manufacturer to sell tubes having slightly discolored surfaces as first quality merchandise. The very small quantity of air that can be trapped under most unfavorable conditions is so well distributed that the resulting tube is of the best quality.

The invention is equally applicable to poles for use in the vulcanization of inner tubes where the tubes are placed in the heaters and vulcanized without wrappings.

Figure 2:
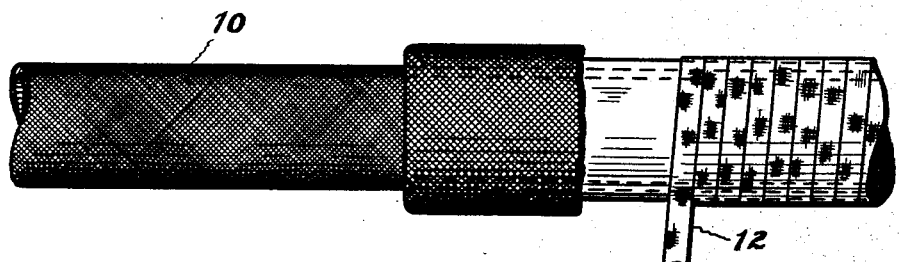
Fig. 2 is a side elevational view of a pole and tube assembly after its vulcanization showing parts of the pole and tube broken away and showing parts of the tube turned back to illustrate the marking on the outer face of the tube.

After the tube is vulcanized, the wrapping 12 is removed and the tube is stripped from the vulcanizing pole 10 in conventional manner. This generally consists in turning the tube back on itself and applying compressed air between the side walls of the tube to facilitate its removal from the pole. A tube with the wrappings partially removed and shown as partially turned back over the pole is shown in Fig. 2. The surface of the tube that was held in contact with the knurled surface of the pole now becomes the outer surface of the tube and, after the air valve is placed in the side wall of the tube in conventional manner the ends of the vulcanized tube are joined together to provide an endless annular tube of conventional form.

Heretofore it has been necessary to grind the surface of the poles used for tube mandrels in order to insure a clean molding surface on the tube pole. This was an expensive operation and it was necessary to perform the operation many times during the life of a vulcanizing pole. In accordance with the present invention I propose that the pole, after having served as a mandrel for a desired number of tubes, be again passed through a knurling machine in order to again knurl its molding surface. The knurling machine will usually closely follow the knurlings of the former operation and thus provide a clear cut knurled surface that is admirably adapted to accomplish the desired purpose. The expense of cleaning tube mandrels is also greatly reduced and only a portion of the time that was formerly required for the grinding of the tube is used to knurl the pole. This enables the manufacturer to keep substantially all of his poles in active service, there being substantially no delay for grinding involved in the proper preparation of the pole for use as a mandrel.

Figure 3:
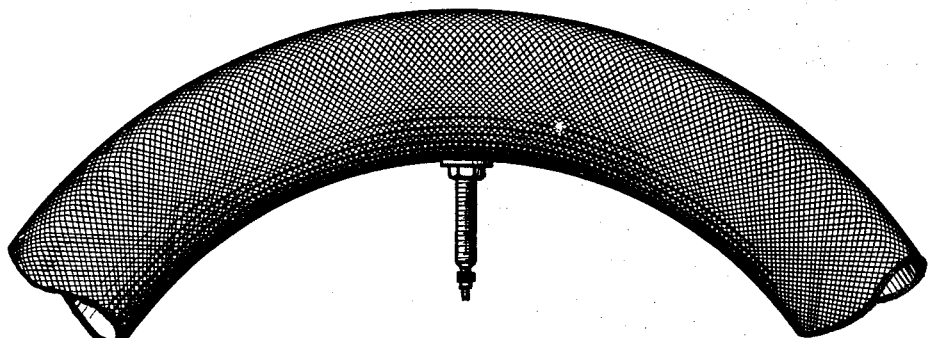
Fig. 3 is a side elevational view of a part of a molded inner tube having its surface covered by a multiplicity of intersecting ridges and constructed in accordance with this invention.
Figure 1:
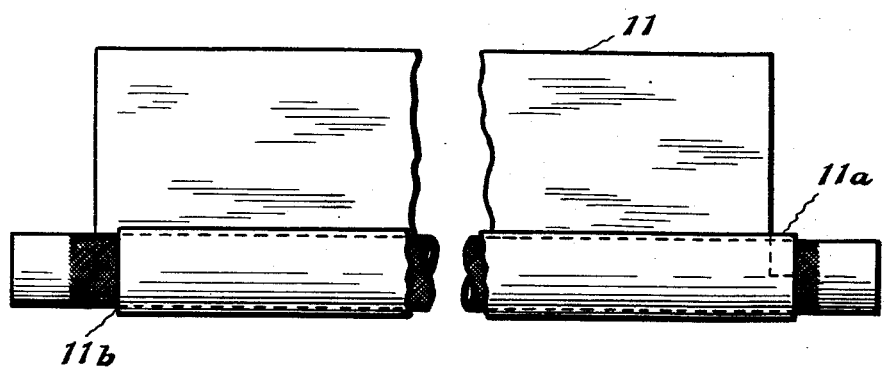
Figure 1 is a top plan view of a tube pole with a sheet of rubber being applied thereto in the formation of a tube in accordance with this invention.

Fig. 3 shows a molded tube of endless annular form that has been cured or vulcanized in a knurled molding cavity. This character of tube is generally referred to as a molded tube to distinguish from the character of tube shown in Fig. 2 that is built on a straight tube mandrel 10 and subsequently turned inside out and its ends joined to provide an endless tube. As previously described, the molded tube shown in Fig. 3 has a knurled surface 13 that is formed by suitable knurled markings in the molding cavity.

Tubes constructed in accordance with this invention have a multiplicity of relatively small size pockets formed on the outer surface thereof that are adapted to more readily hold and distribute the talc or powdered mica that is used between the tire casing and the tube wall in conventional service. It is also much easier to apply the desired quantity of talc to the tube wall by dusting its entire surface instead of by applying an unnecessarily large amount of talc to the casing of the tube which results at times in damage to the tube that is as detrimental as an insufficient supply of such material. The formation of these ridges or pockets in the tube surface also enables the manufacturer to properly supply the desired amount of talc to the surface of the tube when it is boxed for shipment and enables the user of the tube to mount the tube directly in a new tire casing without the use of additional talc or other compound, thus avoiding the necessity of keeping a supply of such compound on hand for use in connection with new tubes.

Although I have described only one character of knurling for the formation of ridges or channels over the surface of the vulcanizing pole and over the surface of the finished tube, I desire that my invention be construed as covering any association of ridges or grooves over the surface of the pole that provide a multiplicity of distribution channels for entrapped air and that provide a multiplicity of talc retaining pockets on the molded face of the tube.

I am aware that deeply grooved poles having one or two relatively wide grooves extending longitudinally or spirally about the pole have heretofore been proposed. My present invention differs from this character of grooving in that I provide a multiplicity of air channels over the pole surface and a multiplicity of pockets of minute size in the surface of the tube for the purposes and having the advantages specified.

It will be apparent to those skilled in the art that many modifications of the invention can be made without departing from the spirit and scope thereof. I desire, therefore, to broadly claim all phases of the invention and to be restricted only by such limitations as are set forth in the appended claims.

What I claim is:

1. An inner tube for use in pneumatic tires having a surface containing a multiplicity of minute pockets adapted to carry a larger quantity of talc therein than would be carried by the smooth surface of the tube.

2. An inner tube for use in a pneumatic tire casing having its outer surface substantially covered by a multiplicity of relatively minute closely associated lubricant carrying pockets.

3. An inner tube for use in connection with a pneumatic tire casing having its outer surface substantially covered by a series of minute intersecting closely associated ridges.

4. An inflatable air container of rubber that is adapted to be carried in a confining casing, said air container having its outer surface covered by a multiplicity of minute closely associated intersecting ridges adapted to provide lubricant carrying pockets therebetween.

In testimony whereof I affix my signature.

HAROLD A. DENMIRE.